(12) United States Patent
Zastoupil (10) Patent No.: US 11,102,570 B2
(45) Date of Patent: Aug. 24, 2021

(54) AUTO-CONFIGURABLE BASS LOUDSPEAKER

(71) Applicant: Bose Corporation, Framingham, MA (US)

(72) Inventor: Greg J. Zastoupil, North Grafton, MA (US)

(73) Assignee: Bose Corporation, Framingham, MA (US)

( * ) Notice: Subject to any disclaimer, the term of this patent is extended or adjusted under 35 U.S.C. 154(b) by 325 days.

(21) Appl. No.: 16/438,138

(22) Filed: Jun. 11, 2019

(65) Prior Publication Data

US 2020/0396535 A1    Dec. 17, 2020

(51) Int. Cl.
| | | |
|---|---|---|
| *H04R 1/28* | (2006.01) | |
| *H04R 1/32* | (2006.01) | |
| *G06F 3/0484* | (2013.01) | |
| *H04R 3/04* | (2006.01) | |

(52) U.S. Cl.
CPC ......... *H04R 1/2815* (2013.01); *G06F 3/0484* (2013.01); *H04R 1/323* (2013.01); *H04R 3/04* (2013.01)

(58) Field of Classification Search
CPC ........ H04R 1/2815; H04R 1/323; H04R 3/04; H04R 1/20; H04R 1/32; H04R 1/347; H04R 1/40; H04R 1/403; G06F 3/0484; H04S 7/30
USPC ............................ 381/334, 303, 304, 305, 27
See application file for complete search history.

(56) References Cited

U.S. PATENT DOCUMENTS

| | | | |
|---|---|---|---|
| 3,722,616 | A | 3/1973 | Beavers |
| 3,739,096 | A | 6/1973 | Iding |
| 4,054,748 | A | 10/1977 | Balogh |
| 6,665,412 | B1 | 12/2003 | Mizoguchi |
| 6,766,033 | B2 | 7/2004 | Jorgensen et al. |
| 7,480,389 | B2 | 1/2009 | Ricks et al. |
| 3,325,931 | A1 | 12/2012 | Howard et al. |
| 8,391,510 | B2 | 3/2013 | Vincenot |
| 8,428,284 | B2 | 4/2013 | Meyer et al. |

(Continued)

FOREIGN PATENT DOCUMENTS

| | | |
|---|---|---|
| DE | 102008013627 A1 | 9/2009 |
| DE | 102008013627 B8 | 6/2015 |
| EP | 3018915 B1 | 6/2018 |

*Primary Examiner* — Jason R Kurr
(74) *Attorney, Agent, or Firm* — Bond, Schoeneck & King. PLLC (57) ABSTRACT

The present disclosure is directed to devices and systems for auto configuration of directional sound. The system comprises: a first and second portable bass loudspeaker, each arranged to radiate sound waves responsive to audio signals. Each portable bass loudspeaker has a sensor for determining whether the portable bass loudspeaker is in an aligned state or non-aligned state, wherein in the aligned state, the first portable bass loudspeaker is oriented in a generally parallel and opposite direction relative to the second portable bass loudspeaker. Each portable bass loudspeaker has an equalization device providing a first equalization setting for outputting audio in response to detection of the aligned state, and a second equalization setting for outputting audio in response to detection of the non-aligned state, wherein the first equalization setting is configured to generate a radiating output from the first and second portable bass loudspeaker in a cardioid pattern.

20 Claims, 6 Drawing Sheets

(56) References Cited

U.S. PATENT DOCUMENTS

| | | |
|---|---|---|
| 8,842,866 B2 | 9/2014 | Christner |
| 9,049,518 B2 | 6/2015 | Freeman et al. |
| 9,288,571 B2 | 3/2016 | Christner et al. |
| 9,635,454 B2 | 4/2017 | Larrieu |
| 9,661,418 B2 * | 5/2017 | Butler .................... G10K 11/26 |
| 9,716,940 B2 | 7/2017 | Roberts |
| 10,104,469 B2 | 10/2018 | Jakowski |
| 10,123,111 B2 | 11/2018 | Gunness |
| 2009/0238372 A1 * | 9/2009 | Hsu ......................... H04R 5/02 |
| | | 381/61 |
| 2013/0322656 A1 | 12/2013 | Adams |
| 2017/0289675 A1 | 10/2017 | Isotalo et al. |
| 2018/0367939 A1 * | 12/2018 | Fischer .................. H04R 1/323 |
| 2018/0376265 A1 | 12/2018 | Warden et al. |

\* cited by examiner

AUTO-CONFIGURABLE BASS LOUDSPEAKER

BACKGROUND

This disclosure relates to audio speaker systems, and in particular, bass loudspeakers.

SUMMARY OF THE INVENTION

The present disclosure is directed to audio speaker systems arranged for auto configuration of directional sound. In particular, low frequency speakers providing omnidirectional sound distribution can be arranged to generate a cardioid patterned sound distribution. Two or more low frequency speakers can be arranged in a particular orientation using a physical engagement member or sensors which detect the orientation of the speakers relative to each other. When the low frequency speakers are in the correct orientation, the system can automatically configure the equalizer and delay phase for multiple bass boxes.

Generally, in an aspect, a first portable bass loudspeaker is provided. The loudspeaker comprises: a sensor, for determining whether the first portable bass loudspeaker is in an aligned state with a second portable bass loudspeaker, wherein in the aligned state the first portable bass loudspeaker is oriented in a generally parallel and opposite direction relative to the second portable bass loudspeaker; and a processor in communication with the sensor and including executable instructions to adjust one or more audio settings of the first portable bass loudspeaker based on detection of the aligned state.

In an aspect, the first portable bass loudspeaker and the second portable bass loudspeaker generate a radiating output in a cardioid pattern.

In an aspect, the sensor is selected from: a Hall-effect sensor, a proximity sensor, a pressure sensor, a magnetic sensor, an optical sensor, an ultrasound sensor, and an infrared sensor.

In an aspect, the first portable bass loudspeaker further comprises a physical engagement component arranged to secure the first portable bass loudspeaker to the second portable bass loudspeaker.

In an aspect, the physical engagement component is selected from a hook and loop fastener, a latching mechanism, and a magnetic fastener.

In an aspect, the first portable bass loudspeaker further comprises a first indicator, having a first indicator characteristic, arranged to indicate whether the first portable bass loudspeaker is in an aligned state with the second portable bass loudspeaker.

In an aspect, the first indicator is a light, wherein the first indicator characteristic include varied light colors and light intensities; or, wherein the first indicator is an auxiliary speaker, wherein the first indicator characteristic includes sounds of varied volume, pitch, or frequency of output.

In an aspect, the first indicator provides an indicator signal, wherein the indicator signal is transmitted to a remote computing device.

In an aspect, the first portable bass loudspeaker further comprises a first controller arranged to receive a first user input via a first user interface.

Generally, in an aspect, first portable bass loudspeaker is provided. The loudspeaker comprises: a sensor, for determining whether the first portable bass loudspeaker is in an aligned state or non-aligned state with a second portable bass loudspeaker, wherein in the aligned state the first portable bass loudspeaker is oriented in a generally parallel and opposite direction relative to the second portable bass loudspeaker; an equalization device providing a first equalization setting for outputting audio in response to detection of the aligned state, and a second equalization setting for outputting audio in response to detection of the non-aligned state; wherein the first equalization setting is configured to generate a radiating output from the first portable bass loudspeaker and the second portable bass loudspeaker in a cardioid pattern.

Generally, in an aspect, a directional loudspeaker system is provided. The loudspeaker system comprises: a first portable bass loudspeaker and a second portable bass loudspeaker, each arranged to radiate sound waves responsive to audio signals; each portable bass loudspeaker having a sensor, for determining whether the portable bass loudspeaker is in an aligned state, wherein in the aligned state the first portable bass loudspeaker is oriented in a generally parallel and opposite direction relative to the second portable bass loudspeaker; each portable bass loudspeaker having a processor in communication with the sensor and including executable instructions to select one or more audio settings of the portable bass loudspeaker based on the detection of the aligned state.

In an aspect, the first portable bass loudspeaker and the second portable bass loudspeaker generate a radiating output in a cardioid pattern.

In an aspect, the sensors are selected from: a Hall-effect sensor, a proximity sensor, a pressure sensor, a magnetic sensor, an optical sensor, an ultrasound sensor, and an infrared sensor.

In an aspect, each portable bass loudspeaker further comprises a physical engagement component arranged to secure the first portable bass loudspeaker to the second portable bass loudspeaker.

In an aspect, the physical engagement component is selected from a hook and loop fastener, a latching mechanism, and a magnetic fastener.

In an aspect, the first portable bass loudspeaker or the second portable bass loudspeaker further comprises a first indicator or a second indicator, respectively, where the first indicator or the second indicator has an indicator characteristic, arranged to indicate whether the first portable bass loudspeaker is in an aligned state with the second portable bass loudspeaker.

In an aspect, the first indicator or the second indicator is a light, wherein the indicator characteristic includes varied light colors and light intensities; or, wherein the first indicator or the second indicator is an auxiliary speaker, wherein the indicator characteristic includes sounds of varied volume, pitch, or frequency of output.

In an aspect, the first indicator or the second indicator provides an indicator signal, wherein the indicator signal is transmitted to a remote computing device.

In an aspect, the first portable bass loudspeaker or the second portable bass loudspeaker further comprises a user interface arranged to receive a user input, the user input assigning the first portable bass loudspeaker or the second portable bass loudspeaker as a primary or secondary loudspeaker or setting a number of loudspeakers in the directional loudspeaker system.

Generally, in an aspect, a directional loudspeaker system is provided. The loudspeaker system comprises: a first portable bass loudspeaker and a second portable bass loudspeaker, each arranged to radiate sound waves responsive to audio signals. Each portable bass loudspeaker has a sensor, for determining whether the portable bass loudspeaker is in an aligned state or non-aligned state, wherein in the aligned state the first portable bass loudspeaker is oriented in a generally parallel and opposite direction relative to the second portable bass loudspeaker. Each portable bass loudspeaker has an equalization device providing a first equalization setting for outputting audio in response to detection of the aligned state, and a second equalization setting for outputting audio in response to detection of the non-aligned state; wherein the first equalization setting is configured to generate a radiating output from the first portable bass loudspeaker and the second portable bass loudspeaker in a cardioid pattern.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

The present disclosure is directed to systems and methods for providing a speaker system arranged for auto configuration of directional sound. In particular, low frequency speakers providing omnidirectional sound distribution can be arranged in an aligned state with correct orientation to generate a cardioid patterned sound distribution. Two or more low frequency speakers can be arranged in the correct orientation using a physical engagement member or sensors which detect the orientation of the speakers. When the low frequency speakers are in the aligned state, the system can automatically configure equalization settings for multiple bass boxes.

Configuring multiple bass boxes for general purpose public address can be challenging and time consuming, requiring access to software and technical data to be entered. Many individuals are not experienced with this process, and errors can cause significant negative experiences. The systems and methods disclosed in the present application simplify setup by automatically detecting when one or more bass boxes are correctly oriented relative to each other, and the systems and methods disclosed in the present application may set the equalization and delay/phase correctly. This improved functionality prevents a user from applying incorrect settings or placing the bass boxes in incorrect locations with incorrect settings.

Figure 1:
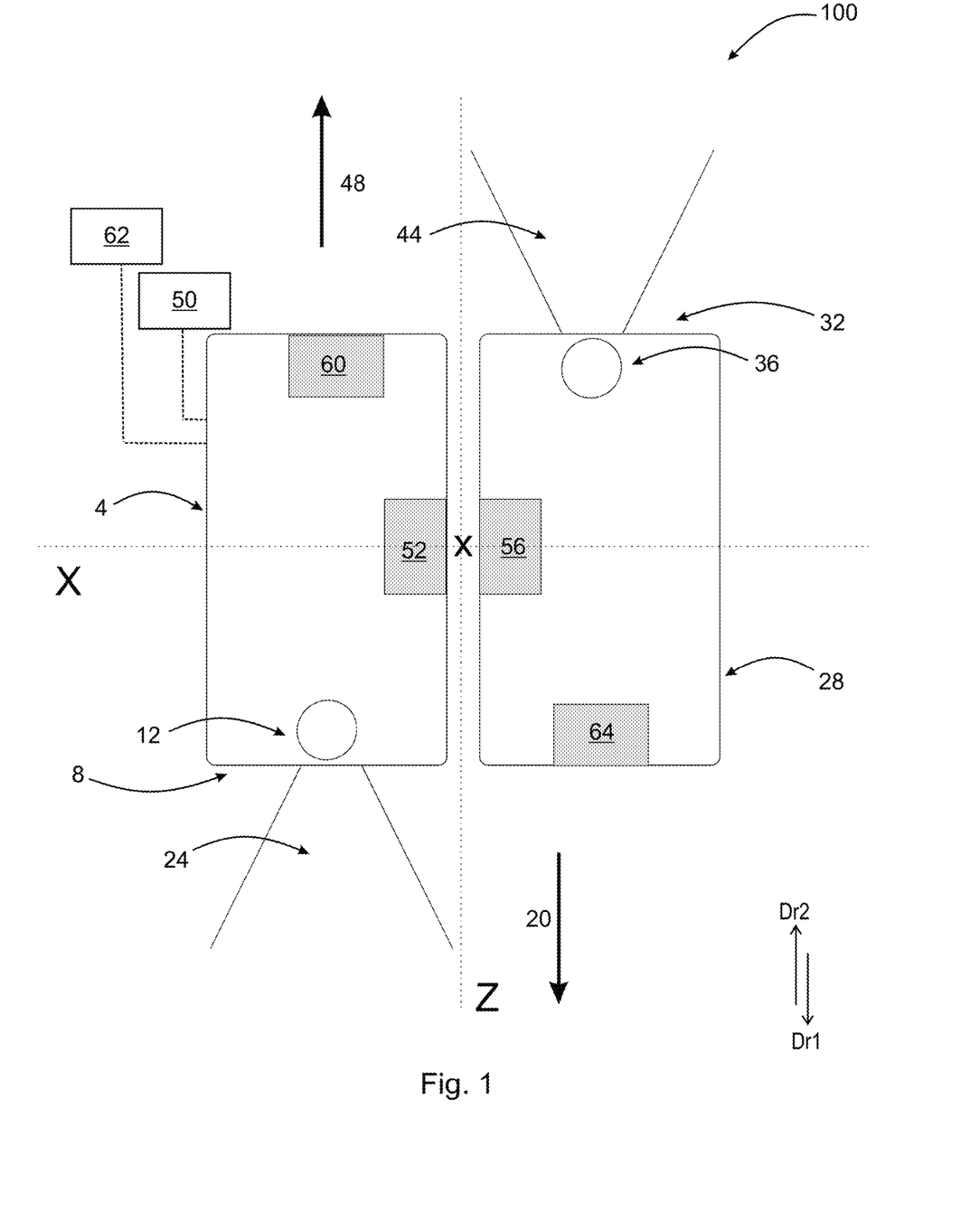
FIG. 1 is a schematic illustration of an exemplary system for auto configuration of bass boxes.
Figure 2:
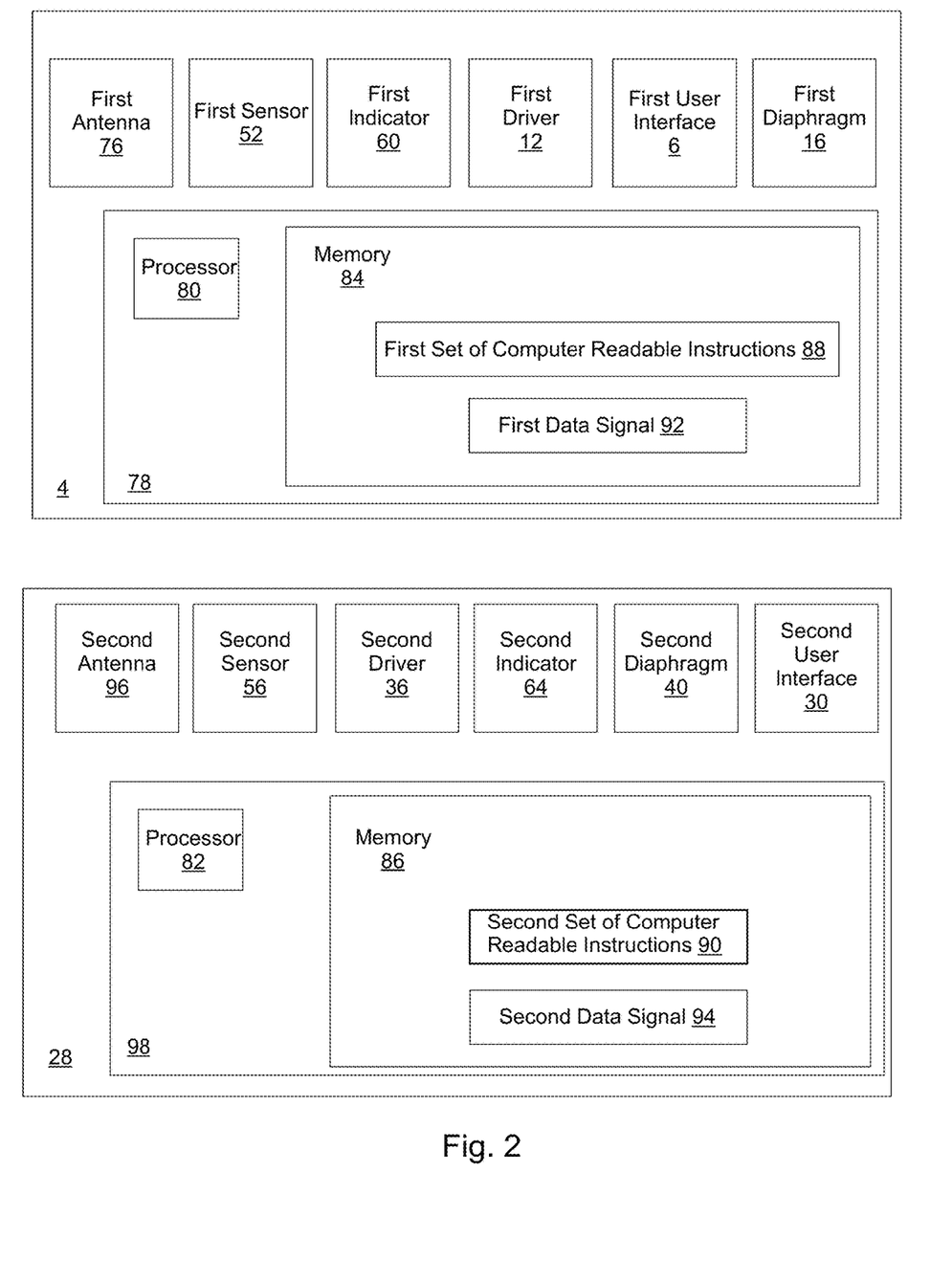
FIG. 2 is a schematic illustration of an exemplary system for auto configuration of bass boxes.

The following description should be read in view of FIG. 1 and FIG. 2. FIG. 1 is a schematic view of a directional loudspeaker system 100 according to aspects of the present disclosure. FIG. 1 shows a directional loudspeaker system 100 comprising a first portable bass loudspeaker 4 which contains a first electro-acoustic driver 12 to generate a first directed radiating output 24 through a first face 8 of a housing of the first portable bass loudspeaker 4. The directional loudspeaker system 100 also contains a second portable bass loudspeaker 28 which contains a second electro-acoustic driver 36 to generate a second directed radiating output 44 through a second face 32 of the housing of the second portable bass loudspeaker 28. The first and second electro-acoustic drivers 12, 36 generate sound directed in a first direction 20 and a second direction 48, respectively.

The first portable bass loudspeaker 4 further comprises a first sensor 52, arranged on, in, or in proximity to the housing of the first portable bass loudspeaker, which is arranged to determine a first orientation 20 of the first portable bass loudspeaker 4. The second portable bass loudspeaker 28 further comprises a second sensor 56, arranged on, in, or in proximity to the housing of the second portable bass loudspeaker 28, which is arranged to determine a second orientation 48 of the second portable bass loudspeaker 28. The first sensor 52 can detect the first orientation 20 of the first portable bass loudspeaker 4 with respect to the second portable bass loudspeaker 28, and the second sensor 56 can detect the orientation 48 of the second portable bass loudspeaker 28 with respect to the first portable bass loudspeaker 4. The first and second sensors 52, 56 can comprise one or more of a Hall effect sensor, a proximity sensor, a pressure sensor, a magnetic sensor, an optical sensor, an infrared sensor, or any other sensor which can detect the first orientation 20 with respect to the second portable bass loudspeaker 28 and/or the second orientation 48 of the with respect to the first portable bass loudspeaker 4 and/or the proximity of the first portable bass loudspeaker 4 to the second portable bass loudspeaker 28.

Exemplary position sensors may include: linear, angular, or multi-axis position sensors, capacitive transducers, capacitive displacement sensors, eddy-current sensors, grating sensors, inductive non-contact position sensors, linear variable differential transformers, rotary encoders, multi-axis displacement transducers, photodiode arrays, and piezo-electric transducers. Exemplary optical sensors may include laser Doppler vibrometers, confocal chromatic sensors, photoresisters, and photodetectors. Exemplary magnetic sensors may include: magnetoresistive sensors, magnetic field sensor, magnetoinductive sensors, flux gate or coil sensors, inductive pickup coils, and vibrating-sample magnetometers. Exemplary pressure sensors include: gauge pressure sensors, vacuum pressure sensors, differential pressure sensors, sealed pressure sensors, piezoresistive strain gauges, capacitive pressure sensors, strain-gauge pressure sensors, potentiometric sensors, force balancing sensors, resonant electronic pressure sensors, thermal electronic pressure sensors, and ionization electronic pressure sensors.

The first sensor 52 and the second sensor 56 can detect that the first portable bass loudspeaker 4 and second portable bass loudspeaker 28 are oriented in generally parallel and opposite directions relative to each other and are in an aligned state (shown in FIG. 1). Data from the first sensor

52, a first data signal 92 (shown in FIG. 2), and the second sensor 56, a second data signal 94 (shown in FIG. 2), regarding the aligned state, is used by the first controller 78 of the first portable bass loudspeaker 4 and second controller 98 of the second portable bass loudspeaker 28, respectively (shown in FIG. 2), to determine whether the first portable bass loudspeaker 4 and second portable bass loudspeaker 28 are in the aligned state and to implement audio settings.

When the first portable bass loudspeaker 4 and the second portable bass loudspeaker 28 are in the aligned state, the first sensor 52 and the second sensor 56 will detect that they are in the aligned state. The first processor 80, which is in communication with the first sensor 52, will execute instructions to adjust one or more audio settings of the first portable bass loudspeaker 4 based on the detected alignment. The second processor 82, which is in communication with the second sensor 56, will execute instructions to adjust one or more audio settings of the second portable bass loudspeaker 28 based on the detected alignment. The audio settings may be adjusted to produce a sound output in a cardioid, hypercardioid, supercardioid, subcardioid, or approximately cardioid pattern, and the setting that may be adjusted include: amplitude, phase and time delay. The first portable bass loudspeaker 4 and the second portable bass loudspeaker 28 may also include an equalization device 50, which provides a first equalization setting for outputting audio in response to detection of the aligned state, and a second equalization setting for outputting audio in response to detection of the non-aligned state. The first equalization setting is configured to generate a radiating output from the first portable bass loudspeaker and second portable bass loudspeaker in a cardioid, hypercardioid, supercardioid, subcardioid, or approximately cardioid pattern. The equalization device 50 (shown in FIG. 1) adjusts the balance between frequency components and may be a component of the first portable bass loudspeaker 4 or the second portable bass loudspeaker 28 or external to the portable bass loudspeakers 4, 28.

Figure 3A:
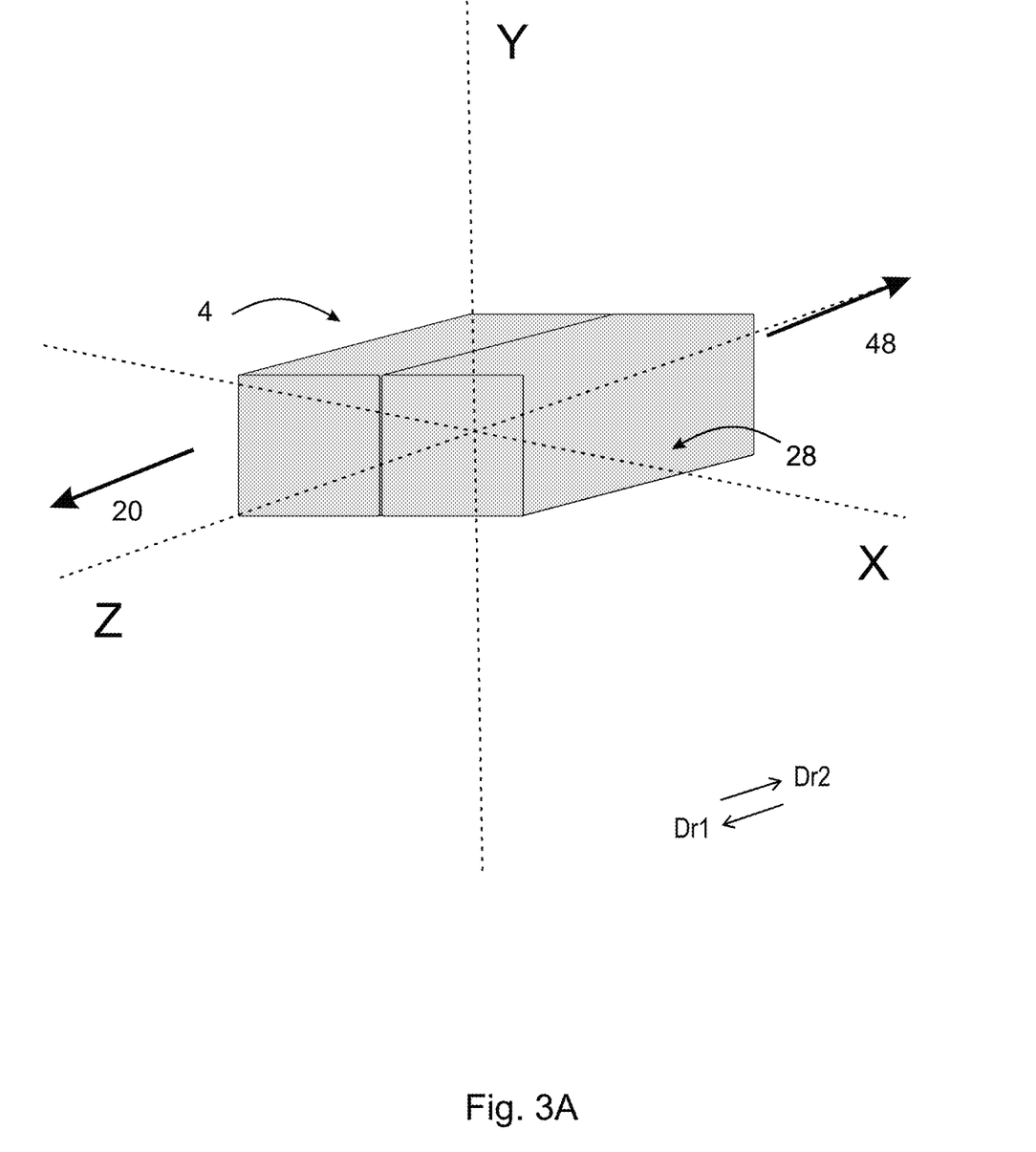
FIG. 3A is a schematic illustration of an exemplary system for auto configuration of bass boxes.
Figure 3B:
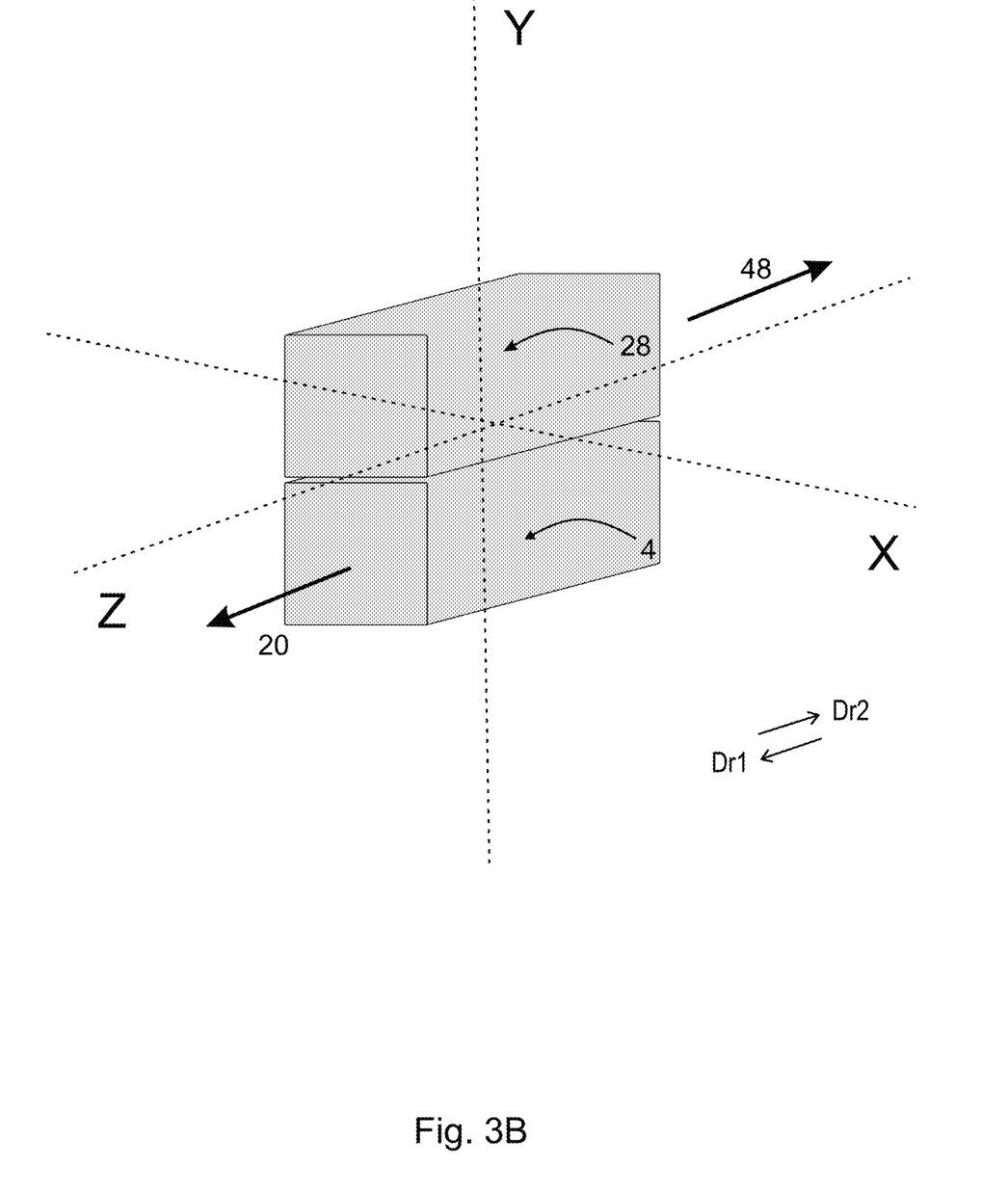
FIG. 3B is a schematic illustration of an exemplary system for auto configuration of bass boxes.

Referring to FIG. 1 and FIG. 2, the first indicator 60 and/or second indicator 64 may provide an indication when the first portable bass loudspeaker 4 and the second portable bass loudspeaker 28 are correctly oriented with respect to each other such that the first orientation 20 and the second orientation 48 are generally parallel and opposite each other. An example of one setup where the first portable bass loudspeaker 4 and second portable bass loudspeaker 28 are in the aligned state is shown in FIG. 3A, where the first portable bass loudspeaker 4 and the second portable bass loudspeaker 28 are located next to each other and provide radiating outputs in opposite directions DR1 and DR2, respectively. First portable bass loudspeaker 4 and second portable bass loudspeaker 28 are located next to each other along an imaginary axis X (which is orthogonal to imaginary axis Y and an imaginary axis Z, which extends along the DR1 and DR2 directions) and have faces which are orthogonal to the first face 8 and the second face 32 which are generally parallel to each other. Another example of a setup where the first portable bass loudspeaker 4 and second portable bass loudspeaker are correctly oriented is shown in FIG. 3B, where the first portable bass loudspeaker 4 and the second portable bass loudspeaker 28 are located on top of each other and provide radiating outputs in opposite directions DR1 and DR2, respectively. First portable bass loudspeaker 4 and the second portable bass loudspeaker 28 are located next to each other along an imaginary axis Y (which is orthogonal to imaginary axis X and an imaginary axis Z, which extends along the DR1 and DR2 directions), and have faces which are orthogonal to the first face 8 and the second face 32 which are generally parallel to each other.

The first portable bass loudspeaker 4 may also contain a first indicator 60, and/or the second portable bass loudspeaker 28 may also contain a second indicator 64, where the first indicator 60 and/or the second indicator 64 provide an indication when the first portable bass loudspeaker 4 and the second portable bass loudspeaker 28 are properly oriented with respect to each other and in the aligned state. The first indicator 60 and/or second indicator 64 may be a light such as an LED or an auxiliary speaker. A visual indicator may be provided on only one loudspeaker when the loudspeakers are correctly positioned and/or oriented and in the aligned state, or the indicator may be provided on both the first portable bass loudspeaker 4 and the second portable bass loudspeaker 28. The indicator may be a binary indicator which provides an indication (or absence of an indication) when the first portable bass loudspeaker 4 and the second portable bass loudspeaker 28 are not correctly oriented and in the non-aligned state, and provides an indication when the two speakers are correctly oriented and in the aligned state. The indicators may also provide a range of indicator characteristics to indicate how close or far the two loudspeakers are from the aligned position and/or orientation. For example, an auxiliary speaker may produce different sounds or sounds of varied volumes, pitches, or sound beeps/pulse of varying frequency or duration. As an example, the auxiliary speaker may output one sound when the portable bass loudspeakers are moved from the aligned state to the non-aligned state and output a different sound when the portable bass loudspeakers are moved from a non-aligned state to an aligned state. The auxiliary speaker may output sound pulses, where the sound pulses increase in frequency or the time gap between the pulses decreases as the two speakers are moved closer and closer to the aligned state. A visual indicator in the form of a light may also be provided. For example, the light color may change from one color to another color as the portable bass loudspeakers are moved from the non-aligned state to the aligned state and change back again when the portable bass loudspeakers are moved from the aligned state to the non-aligned state. The light indicator may also, as an example, increase in intensity as the two speakers are moved closer and closer to the aligned state.

As an example, the first indicator 60 is controlled by the first controller 78 of the first portable bass loudspeaker 4, and the second indicator 64 is controlled by the second controller 98 of the second portable bass loudspeaker 28. The first indicator 60 or the second indicator 64 may provide an electrical indicator signal which is transmitted, via the first antenna 76 or second antenna 96 operating with the first controller 78 or second controller 98 (shown in FIG. 2), respectively, of the first portable bass loudspeaker 4 or second portable bass loudspeaker 28, respectively, to a remote computing device 62 (shown in FIG. 1). The remote computing device 62 may be a tablet, smartphone, computer, etc., which is being utilized to setup the speaker system or may be the source of the audio signal to be outputted by the loudspeakers. As another example, the indicator may be provided remotely. The first controller 78 of the first loudspeaker 4 may provide a first data signal 92 indicating the first orientation 20 of the first portable bass loudspeaker 4 to a remote computing device 62. The second controller 98 of the second portable bass loudspeaker 28 may provide a second data signal 94 indicating the second orientation 48 of the second speaker 28 to the remote computing device 62. The first portable bass loudspeaker 4 comprises a first controller 78, comprising a first memory 84 and a first processor 80, which transmits the first data signal 92 to the remote device 62 using the first antenna 76. The second portable bass loudspeaker 28 comprises a second controller 98, comprising a second memory 86 and a second processor 82, which transmits the second data signal 94 to the remote device 62 using the second antenna 96. The remote device may then provide an indicator to a user that the first portable bass loudspeaker 4 and the second portable bass loudspeaker 28 are correctly oriented in the aligned state.

Referring to FIG. 2, the first antenna 76 and second antenna 96 may be or include any module, device, or means capable of enabling the transmission and/or reception of a wired or wireless communication signal, e.g., a transmitter, receiver, transceiver, antenna, etc., utilizing technologies that include, but are not limited to Wi-Fi (e.g., IEEE 802.11), Bluetooth, cellular, Ethernet, Zigbee, etc. The first processor 80 and second processors 82 (e.g., for the first controller 78 and second controllers 98) may take any suitable form, such as a microcontroller, plural microcontrollers, circuitry, a single processor, or plural processors configured to execute software instructions. Similarly, the first memory 84 and second memory 86 (e.g., for the first controller 78 and second controllers 98) may take any suitable form or forms, including a volatile memory, such as random access memory (RAM), or non-volatile memory such as read only memory (ROM), flash memory, a hard disk drive (HDD), a solid state drive (SSD), or other data storage media. Memory may be used by a processor for the temporary storage of data during its operation. Data and software, such as the algorithms or software necessary to perform the methods and provide the features and functionality discussed herein, as well as an operating system, firmware, or other application, may be installed in memory 84, 86.

Figure 4:
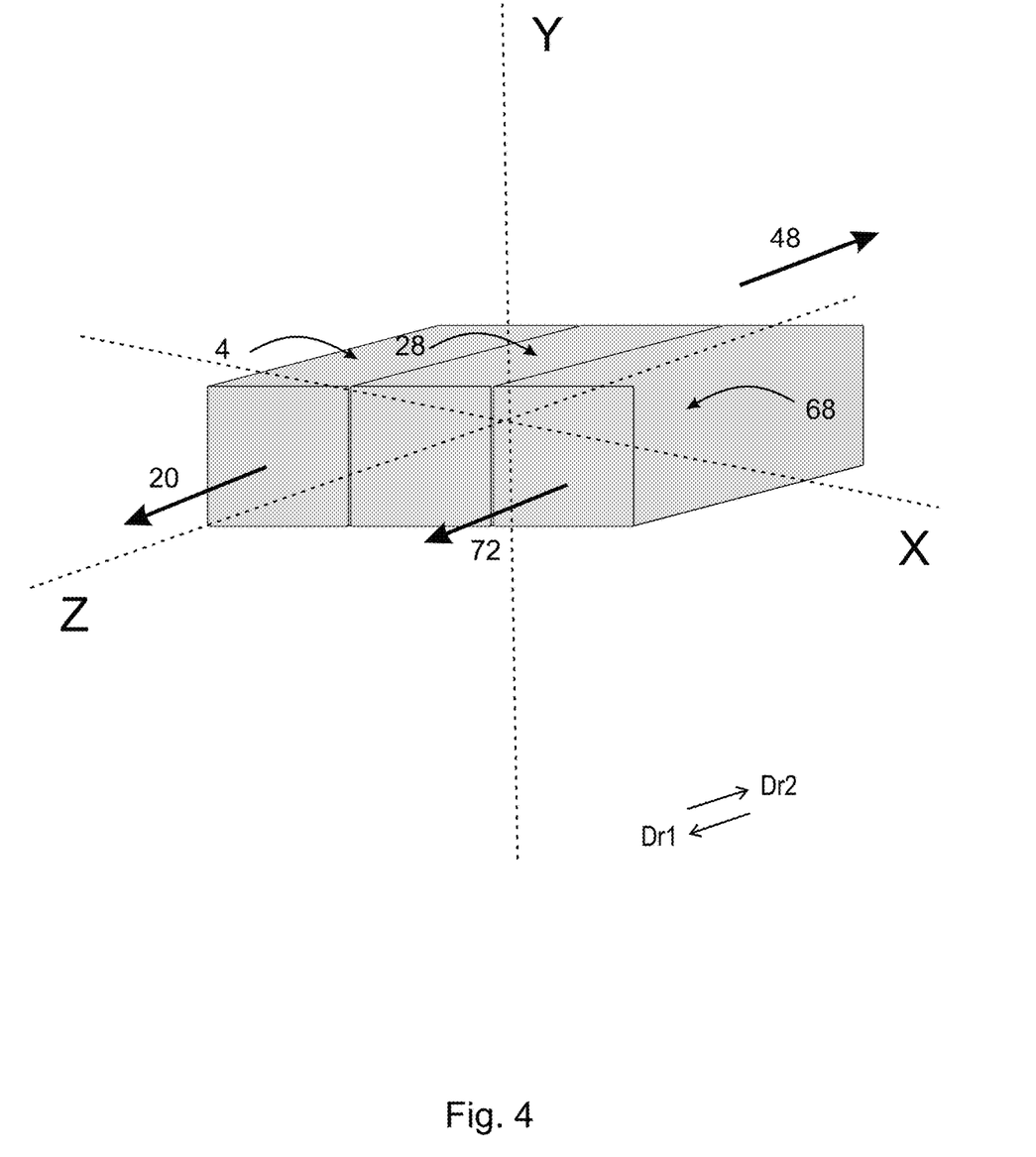
FIG. 4 is a schematic illustration of an exemplary system for auto configuration of bass boxes.

System 100 is configured to provide a cardioid pattern for the sound directed from the first loudspeaker and the second loudspeaker. This pattern provides directed sound in a forward direction (DR1 in FIG. 1 and FIG. 3A-B) and inhibited sound in a backwards direction (DR2 in FIG. 1 and FIG. 3A-B). The first portable bass loudspeaker 4 and/or the second portable bass loudspeaker 28 may further comprise a first user interface 6 and/or second user interface 30, respectively, for designating which of the portable bass loudspeakers should serve as the primary speaker and provide the directed sound in a forward direction and which of the portable bass loudspeakers should serve as the secondary loudspeaker and provide sound in a backwards direction. A first user interface 6 may be located on, in, or in proximity to the housing of the first portable bass loudspeaker 4; a second user interface 30 may be located on, in, or in proximity to the housing of the second portable bass loudspeaker 28; or a user interface may be remotely located, on for example, a remote computing device used for setting up a speaker system or for receiving the audio input. As another example, the first indicator 60 and the second indicator 64 may be different from each other and provide an indication of which speaker housing should serve as the primary speaker housing based on this difference. The user interface located remotely or the user interfaces 6, 30 on the speaker housings may also be used to designate the number of speakers in the speaker system from which a cardioid sound pattern is to be directed. For example, the speaker system may comprise three or more portable bass loudspeakers 4, 28, 68 arranged in orientations 20, 48, and 72, respectively, from which sound is directed in a cardioid pattern (shown in FIG. 4).

Figure 5:
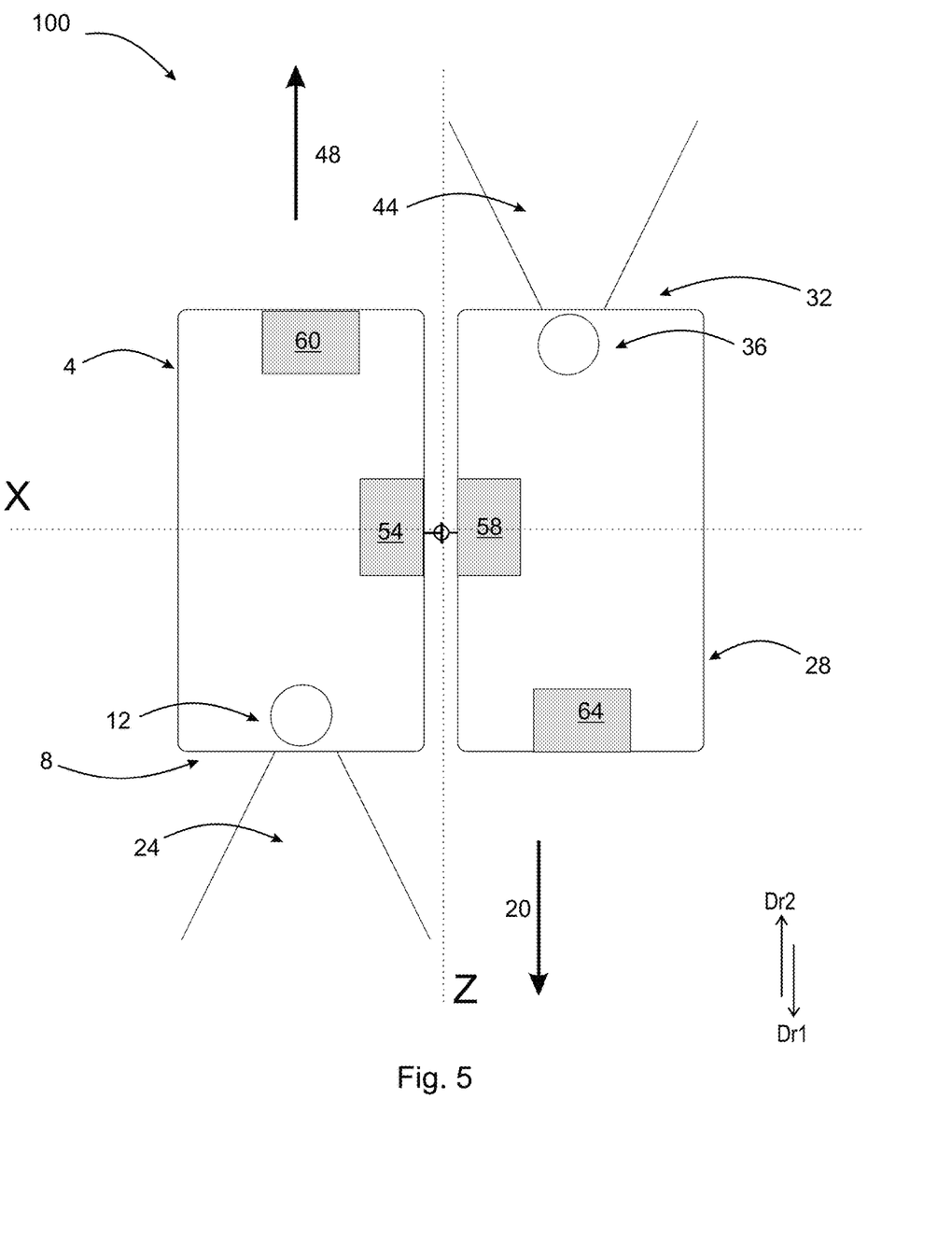
FIG. 5 is a schematic illustration of an exemplary system for auto configuration of bass boxes.

As an example, shown in FIG. 5, the first portable bass loudspeaker 4 and the second portable bass loudspeaker 28 may be secured together using physical engagement components 54, 58 arranged to secure the first portable bass loudspeaker 4 in a first orientation 20 and the second portable bass loudspeaker 28 in a second orientation 48. The physical engagement member may comprise a first physical engagement component 54 located on, in, or in proximity to the housing of the first portable bass loudspeaker 4 and a second physical engagement component 58 may be located on, in, or in proximity to the housing of the second portable bass loudspeaker 28. The physical engagement members may be used to arrange the first portable bass loudspeaker 4 and the second portable bass loudspeaker 28 in the correct orientation with respect to each other. The physical engagement components 54, 58 may include a hook and loop fastener, a latching mechanism, a magnetic fastener, or any other methods to securely engage the two portable bass loudspeakers. First sensor 52 and second sensor 56 include any types of sensors or detection systems which can determine whether the first loudspeaker 4 and the second loudspeaker 28 are secured together and in the aligned state.

While several implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A first portable bass loudspeaker comprising:
   a sensor, for determining whether the first portable bass loudspeaker is in an aligned state with a second portable bass loudspeaker, wherein in the aligned state the first portable bass loudspeaker is oriented in a generally parallel and opposite direction relative to the second portable bass loudspeaker; and
   a processor in communication with the sensor and including executable instructions to adjust one or more audio settings of the first portable bass loudspeaker based on detection of the aligned state.

2. The first portable bass loudspeaker of claim 1, wherein the first portable bass loudspeaker and the second portable bass loudspeaker generate a radiating output in a cardioid pattern.

3. The first portable bass loudspeaker of claim 1, wherein the sensor is selected from: a Hall-effect sensor, a proximity sensor, a pressure sensor, a magnetic sensor, an optical sensor, an ultrasound sensor, and an infrared sensor.

4. The first portable bass loudspeaker of claim 1, wherein the first portable bass loudspeaker further comprises a physical engagement component arranged to secure the first portable bass loudspeaker to the second portable bass loudspeaker.

5. The first portable bass loudspeaker of claim 4, wherein the physical engagement component is selected from a hook and loop fastener, a latching mechanism, and a magnetic fastener.

6. The first portable bass loudspeaker of claim 1, wherein the first portable bass loudspeaker further comprises a first indicator, having a first indicator characteristic, arranged to indicate whether the first portable bass loudspeaker is in an aligned state with the second portable bass loudspeaker.

7. The first portable bass loudspeaker of claim 6, wherein the first indicator is a light, wherein the first indicator characteristic includes varied light colors and light intensities; or, wherein the first indicator is an auxiliary speaker, wherein the first indicator characteristic includes sounds of varied volume, pitch, or frequency of output.

8. The first portable bass loudspeaker of claim 6, wherein the first indicator provides an indicator signal, wherein the indicator signal is transmitted to a remote computing device.

9. The first portable bass loudspeaker of claim 1, wherein the first portable bass loudspeaker further comprises a first controller arranged to receive a first user input via a first user interface.

10. A first portable bass loudspeaker comprising:
 a sensor, for determining whether the first portable bass loudspeaker is in an aligned state or non-aligned state with a second portable bass loudspeaker, wherein in the aligned state the first portable bass loudspeaker is oriented in a generally parallel and opposite direction relative to the second portable bass loudspeaker;
 an equalization device providing a first equalization setting for outputting audio in response to detection of the aligned state, and a second equalization setting for outputting audio in response to detection of the non-aligned state;
 wherein the first equalization setting is configured to generate a radiating output from the first portable bass loudspeaker and the second portable bass loudspeaker in a cardioid pattern.

11. A directional loudspeaker system comprising:
 a first portable bass loudspeaker and a second portable bass loudspeaker, each arranged to radiate sound waves responsive to audio signals;
 each portable bass loudspeaker having a sensor, for determining whether the portable bass loudspeaker is in an aligned state, wherein in the aligned state the first portable bass loudspeaker is oriented in a generally parallel and opposite direction relative to the second portable bass loudspeaker;
 each portable bass loudspeaker having a processor in communication with the sensor and including executable instructions to select one or more audio settings of the portable bass loudspeaker based on the detection of the aligned state.

12. The directional loudspeaker system of claim 11, wherein the first portable bass loudspeaker and the second portable bass loudspeaker generate a radiating output in a cardioid pattern.

13. The directional loudspeaker system of claim 11, wherein the sensors are selected from: a Hall-effect sensor, a proximity sensor, a pressure sensor, a magnetic sensor, an optical sensor, an ultrasound sensor, and an infrared sensor.

14. The directional loudspeaker system of claim 11, wherein each portable bass loudspeaker further comprises a physical engagement component arranged to secure the first portable bass loudspeaker to the second portable bass loudspeaker.

15. The directional loudspeaker system of claim 14, wherein the physical engagement component is selected from a hook and loop fastener, a latching mechanism, and a magnetic fastener.

16. The directional loudspeaker system of claim 11, wherein the first portable bass loudspeaker or the second portable bass loudspeaker further comprises a first indicator or a second indicator, respectively, where the first indicator or the second indicator has an indicator characteristic, arranged to indicate whether the first portable bass loudspeaker is in an aligned state with the second portable bass loudspeaker.

17. The directional loudspeaker system of claim 16, wherein the first indicator or the second indicator is a light, wherein the indicator characteristic includes varied light colors and light intensities; or, wherein the first indicator or the second indicator is an auxiliary speaker, wherein the indicator characteristic includes sounds of varied volume, pitch, or frequency of output.

18. The directional loudspeaker system of claim 16, wherein the first indicator or the second indicator provides an indicator signal, wherein the indicator signal is transmitted to a remote computing device.

19. The directional loudspeaker system of claim 11, wherein the first portable bass loudspeaker or the second portable bass loudspeaker further comprises a user interface arranged to receive a user input, the user input assigning the first portable bass loudspeaker or the second portable bass loudspeaker as a primary or secondary loudspeaker or setting a number of loudspeakers in the directional loudspeaker system.

20. A directional loudspeaker system comprising:
 a first portable bass loudspeaker and a second portable bass loudspeaker, each arranged to radiate sound waves responsive to audio signals,
 each portable bass loudspeaker having a sensor, for determining whether the portable bass loudspeaker is in an aligned state or non-aligned state, wherein in the aligned state the first portable bass loudspeaker is oriented in a generally parallel and opposite direction relative to the second portable bass loudspeaker;
 each portable bass loudspeaker having an equalization device providing a first equalization setting for outputting audio in response to detection of the aligned state, and a second equalization setting for outputting audio in response to detection of the non-aligned state;
 wherein the first equalization setting is configured to generate a radiating output from the first portable bass loudspeaker and the second portable bass loudspeaker in a cardioid pattern.

\* \* \* \* \*